United States Patent
Waltman et al.

(10) Patent No.: US 8,885,308 B2
(45) Date of Patent: Nov. 11, 2014

(54) INPUT CONTROL APPARATUS AND METHOD WITH INRUSH CURRENT, UNDER AND OVER VOLTAGE HANDLING

(75) Inventors: Barry F. Waltman, Bothell, WA (US); Rodney Alan Hughes, Tacoma, WA (US); Reid Adriance, Mill Creek, WA (US); Bertrand Nkei, Redmond, WA (US); Jay Allen Kuehny, Sammamish, WA (US)

(73) Assignee: Crane Electronics, Inc., Redmond, WA (US)

( * ) Notice: Subject to any disclaimer, the term of this patent is extended or adjusted under 35 U.S.C. 154(b) by 718 days.

(21) Appl. No.: 13/185,210

(22) Filed: Jul. 18, 2011

(65) Prior Publication Data

US 2013/0021702 A1  Jan. 24, 2013

(51) Int. Cl.
 *H02H 3/20* (2006.01)
 *H02H 3/24* (2006.01)
 *H02H 3/087* (2006.01)
 *H02H 9/02* (2006.01)
 *H02M 1/32* (2007.01)
 *H02M 1/36* (2007.01)

(52) U.S. Cl.
 CPC .......... *H02H 3/202* (2013.01); *H02H 3/24* (2013.01); *H02H 3/087* (2013.01); *H02H 9/025* (2013.01); *H02M 1/32* (2013.01); *H02M 1/36* (2013.01)
 USPC .......................................................... 361/90

(58) Field of Classification Search
 USPC .......................................................... 361/90
 See application file for complete search history.

(56) References Cited

U.S. PATENT DOCUMENTS

| | | |
|---|---|---|
| 4,128,868 A | 12/1978 | Gamble |
| 4,635,002 A | 1/1987 | Riebeek |
| 4,743,835 A | 5/1988 | Bossé et al. |
| 4,992,919 A | 2/1991 | Lee et al. |
| 5,148,357 A | 9/1992 | Paice |
| 5,418,502 A | 5/1995 | Ma et al. |

(Continued)

FOREIGN PATENT DOCUMENTS

| | | |
|---|---|---|
| CN | 103582997 A | 2/2014 |
| JP | 2001-320250 A | 11/2001 |

(Continued)

OTHER PUBLICATIONS

"Application Guide: Theory of Operation," MicroPower Direct, URL=http://micropowerdirect.com/PDF%20Files/Application%20Notes/Power%20Supply%20Theory%20of%20Operation.pdf, download date Apr. 18, 2012, 6 pages.

(Continued)

*Primary Examiner* — Ronald W Leja
(74) *Attorney, Agent, or Firm* — Seed IP Law Group PLLC

(57) ABSTRACT

Control circuitry handles inrush current, and may provide under voltage and/or over voltage monitoring and handling, as well as remote enable handling. The circuitry may advantageously employ a sense capacitor in parallel with an input capacitor (e.g., bulk input filter capacitor), and a current mirror to produce a signal proportional to input current. A clamp circuit may control a series pass device to regulate current in response to the proportional signal, or to interrupt current flow in response to an under voltage or over voltage condition or receipt of a signal indicative of a disable state. An enable signal may be summed into a comparator that handles under voltage condition determination.

18 Claims, 5 Drawing Sheets

(56) References Cited

U.S. PATENT DOCUMENTS

| | | | |
|---|---|---|---|
| 5,430,640 | A | 7/1995 | Lee |
| 5,481,225 | A | 1/1996 | Lumsden et al. |
| 5,521,807 | A | 5/1996 | Chen et al. |
| 5,631,822 | A | 5/1997 | Silberkleit et al. |
| 5,638,262 | A | 6/1997 | Brown |
| 5,694,303 | A | 12/1997 | Silberkleit et al. |
| 5,774,347 | A | 6/1998 | Nakanishi |
| 5,903,504 | A | 5/1999 | Chevallier et al. |
| 6,043,705 | A | 3/2000 | Jiang |
| 6,137,373 | A | 10/2000 | Mori |
| 6,157,180 | A | 12/2000 | Kuo |
| 6,335,872 | B1 | 1/2002 | Zhou et al. |
| 6,343,026 | B1 | 1/2002 | Perry |
| 6,456,511 | B1 | 9/2002 | Wong |
| 6,472,852 | B1 | 10/2002 | Lethellier |
| 6,545,534 | B1 | 4/2003 | Mehr |
| 6,643,151 | B1 | 11/2003 | Nebrigic et al. |
| 6,697,955 | B1 | 2/2004 | Malik et al. |
| 6,850,048 | B2 * | 2/2005 | Orr et al. .................. 323/299 |
| 6,998,901 | B2 | 2/2006 | Lee |
| 7,061,212 | B2 | 6/2006 | Phadke |
| 7,183,727 | B2 | 2/2007 | Ferguson et al. |
| 7,206,210 | B2 | 4/2007 | Harnett et al. |
| 7,286,376 | B2 | 10/2007 | Yang |
| 7,304,828 | B1 * | 12/2007 | Shvartsman ................. 361/93.1 |
| 7,339,804 | B2 | 3/2008 | Uchida |
| 7,515,005 | B2 | 4/2009 | Dan |
| 7,564,706 | B1 | 7/2009 | Herbert |
| 7,577,539 | B2 | 8/2009 | Hubanks et al. |
| 7,579,901 | B2 | 8/2009 | Yamashita |
| 7,602,273 | B2 | 10/2009 | Yoshikawa |
| 7,730,981 | B2 | 6/2010 | McCabe et al. |
| 7,742,318 | B2 | 6/2010 | Fu et al. |
| 7,847,519 | B2 | 12/2010 | Ho |
| 7,884,317 | B2 | 2/2011 | Casper |
| 8,040,699 | B2 | 10/2011 | Huynh et al. |
| 8,067,992 | B2 | 11/2011 | Chen et al. |
| 8,358,118 | B2 | 1/2013 | Chen et al. |
| 8,520,415 | B1 | 8/2013 | Krishnamoorthy et al. |
| 8,552,589 | B2 | 10/2013 | Ghosh et al. |
| 8,649,128 | B2 | 2/2014 | Wang et al. |
| 2002/0015320 | A1 | 2/2002 | Mochikawa et al. |
| 2002/0071300 | A1 | 6/2002 | Jang et al. |
| 2004/0125523 | A1 | 7/2004 | Edwards et al. |
| 2006/0039172 | A1 | 2/2006 | Soldano |
| 2006/0132105 | A1 | 6/2006 | Prasad et al. |
| 2006/0212138 | A1 * | 9/2006 | Zhang ............................ 700/22 |
| 2006/0220629 | A1 | 10/2006 | Saito et al. |
| 2008/0031014 | A1 | 2/2008 | Young |
| 2009/0067206 | A1 | 3/2009 | Oguchi et al. |
| 2009/0167432 | A1 | 7/2009 | van den Heuvel |
| 2009/0174381 | A1 | 7/2009 | Ojanen et al. |
| 2009/0237057 | A1 | 9/2009 | Dishman et al. |
| 2009/0256547 | A1 | 10/2009 | Akyildiz et al. |
| 2009/0273431 | A1 | 11/2009 | Hurst |
| 2009/0302775 | A1 | 12/2009 | Alexandrov |
| 2010/0014330 | A1 | 1/2010 | Chang et al. |
| 2010/0117715 | A1 | 5/2010 | Ariyama |
| 2010/0176755 | A1 | 7/2010 | Hoadley et al. |
| 2010/0253309 | A1 | 10/2010 | Xi et al. |
| 2011/0169471 | A1 * | 7/2011 | Nagasawa .................... 323/283 |
| 2011/0241637 | A1 | 10/2011 | Parker |
| 2013/0245854 | A1 * | 9/2013 | Rinne et al. ................... 700/297 |
| 2014/0016356 | A1 | 1/2014 | Furmanczyk et al. |
| 2014/0070887 | A1 | 3/2014 | Lam et al. |

FOREIGN PATENT DOCUMENTS

| | | | |
|---|---|---|---|
| JP | 2002-076799 | A | 3/2002 |
| JP | 2007-263944 | A | 10/2007 |
| JP | 5030216 | B2 | 9/2012 |
| KR | 2008-019196 | A | 3/2008 |
| KR | 2008-101784 | A | 11/2008 |
| WO | 2011/123680 | A2 | 10/2011 |
| WO | 2012/116263 | A1 | 8/2012 |
| WO | 2014/039982 | A1 | 3/2014 |

OTHER PUBLICATIONS

"Buck converter," URL=http://en.wikipedia.org/wiki/Buck_converter, download date Jun. 23, 2011, 14 pages.

"Maximum Flexible Power (MFP) Single Output Point of Load: Technical Preview—3-6 VDC IN, 7 AMP, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, URL=http://www.maxim-ic.com/appnotes/index.mvp/id/652, download date Jun. 22, 2011, 6 pages.

Hughes, "Oscillator Apparatus and Method With Wide Adjustable Frequency Range," U.S. Appl. No. 13/185,152, filed Jul. 18, 2011, 37 pages.

Hughes et al., "Self Synchronizing Power Converter Apparatus and Method Suitable for Auxiliary Bias for Dynamic Load Applications," U.S. Appl. No. 13/185,217, filed Jul. 18, 2011, 44 Pages.

Hume et al., "Power Converter Apparatus and Method With Compensation for Light Load Conditions," U.S. Appl. No. 13/185,142, filed Jul. 18, 2011, 31 pages.

Waltman et al., "Power Converter Apparatus and Method With Compensation for Current Limit/Current Share Operation," U.S. Appl. No. 13/185,172, filed Jul. 18, 2011, 45 pages.

Waltman et al., "Power Converter Apparatus and Methods," U.S. Appl. No. 61/508,937, filed Jul. 18, 2011, 139 pages.

eCircuit Center, "Op Amp Offset Adjustment," 2002, retrieved from http://www.ecircuitcenter.com/Circuits/op_voff/op_voff2.htm on Mar. 26, 2012, 3 pages.

eCircuit Center, "Op Amp Offset Voltage," 2002, retrieved from http://www.ecircuitcenter.com/Circuits/op_voff/op_voff.htm on Mar. 26, 2012, 3 pages.

Hughes, "Oscillator Apparatus and Method With Wide Adjustable Frequency Range," Office Action mailed Jun. 5, 2013, for U.S. Appl. No. 13/185,152, 17 pages.

Hughes, "Oscillator Apparatus and Method With Wide Adjustable Frequency Range," Amendment filed Oct. 7, 2013, for U.S. Appl. No. 13/185,152, 15 pages.

Hughes, "Oscillator Apparatus and Method With Wide Adjustable Frequency Range," Office Action mailed Jan. 28, 2014, for U.S. Appl. No. 13/185,152, 15 pages.

Hughes et al., "Self Synchronizing Power Converter Apparatus and Method Suitable for Auxiliary Bias for Dynamic Load Applications," Notice of Allowance mailed May 14, 2014, for U.S. Appl. No. 13/185,217, 10 pages.

International Search Report, mailed Dec. 20, 2013, for PCT/US2013/058784, 3 pages.

Lam et al., "Impedance Compensation for Operational Amplifiers Used in Variable Environments," Office Action mailed Feb. 7, 2014, for U.S. Appl. No. 13/609,107, 11 pages.

Lam et al., "Impedance Compensation for Operational Amplifiers Used in Variable Environments," Amendment filed May 6, 2014, for U.S. Appl. No. 13/609,107, 12 pages.

Ng, "Implementing Constant Current Constant Voltage AC Adapter by NCP1200 and NCP4300A," on Semiconductor, Application Note, Publication Order No. AND8042/D, Feb. 2001, 12 pages.

Nguyen et al., "Nulling Input Offset Voltage of Operational Amplifiers," Mixed Signal Products, Texas Instruments—Application Report SLOA045, Aug. 2000, pp. 1-15.

Parker, "Switched Capacitor Hold-Up Scheme for Constant Boost Output Voltage," Office Action mailed Mar. 28, 2012, for U.S. Appl. No. 12/751,067, 16 pages.

Parker, "Switched Capacitor Hold-Up Scheme for Constant Boost Output Voltage," Amendment filed Jul. 30, 2012, for U.S. Appl. No. 12/751,067, 18 pages.

(56) References Cited

OTHER PUBLICATIONS

Parker, "Switched Capacitor Hold-Up Scheme for Constant Boost Output Voltage," Office Action mailed Nov. 16, 2012, for U.S. Appl. No. 12/751,067, 20 pages.

Parker, "Switched Capacitor Hold-Up Scheme for Constant Boost Output Voltage," Amendment filed Jan. 16, 2013, for U.S. Appl. No. 12/751,067, 15 pages.

Parker, "Switched Capacitor Hold-Up Scheme for Constant Boost Output Voltage," Amendment filed Feb. 15, 2013, for U.S. Appl. No. 12/751,067, 15 pages.

Parker, "Switched Capacitor Hold-Up Scheme for Constant Boost Output Voltage," Office Action mailed Jul. 30, 2013, for U.S. Appl. No. 12/751,067, 18 pages.

Parker, "Switched Capacitor Hold-Up Scheme for Constant Boost Output Voltage," Amendment filed Oct. 30, 2013, for U.S. Appl. No. 12/751,067, 19 pages.

Parker, "Switched Capacitor Hold-Up Scheme for Constant Boost Output Voltage," Notice of Allowance mailed Feb. 3, 2014, for U.S. Appl. No. 12/751,067, 11 pages.

Pascu, "Error Amplifier with Forced Equilibrium Adaptor," Kepco, Inc., retrieved from http://www.kepcopower.com/equibm2.htm#fig2, dated May 22, 2014, 8 pages.

Waltman et al., "Power Converter Apparatus and Method With Compensation for Current Limit/Current Share Operation," Amendment filed Mar. 17, 2014, for U.S. Appl. No. 13/185,172, 16 pages.

Waltman et al., "Power Converter Apparatus and Method With Compensation for Current Limit/Current Share Operation," Notice of Allowance mailed May 8, 2014, for U.S. Appl. No. 13/185,172, 10 pages.

Written Opinion, mailed Oct. 14, 2011, for PCT/US2011/030778, 5 pages.

Written Opinion, mailed Dec. 20, 2013, for PCT/US2013/058784, 4 pages.

International Search Report, mailed Oct. 14, 2011, for PCT/US2011/030778, 3 pages.

Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.

Merriam-Webster, "Directly," retrieved from http://www.merriam-webster.com/dictionary/directly, on Nov. 6, 2012, 1 page.

Xing et al., "Power System Architecture with Back-Up Power for Servers," ERC Program of the National Science Foundation, 5 pages.

Office Action, dated Dec. 17, 2013, for Corresponding U.S. Appl. No. 13/185,172, 15 pages.

Hume et al., "Power Converter Apparatus and Method With Compensation for Light Load Conditions," Office Action mailed Nov. 6, 2013 for U.S. Appl. No. 13/185,142, 11 pages.

\* cited by examiner

INPUT CONTROL APPARATUS AND METHOD WITH INRUSH CURRENT, UNDER AND OVER VOLTAGE HANDLING

BACKGROUND

1. Technical Field

This disclosure is generally input control to handle input current, and in particular to handle inrush current, and under voltage and over voltage conditions. Such may, for example be useful in a wide variety of devices or systems, particularly those with relatively large input capacitors, for example power converters, such as regulated switched mode power converters with bulk input filter capacitors.

2. Description of the Related Art

Power converters are used to transform electrical energy, for example converting between alternating current (AC) and direct current (DC), adjusting (e.g., stepping up, stepping down) voltage or potential levels and/or frequency.

Power converters take a large variety of forms. One of the most common forms is the switched-mode power converter or supply. Switched-mode power converters employ a switching regulator to efficiently convert voltage or current characteristics of electrical power. Switched-mode power converters typically employ a storage component (e.g., inductor, transformer, capacitor) and a switch that quickly switches between full ON and full OFF states, minimizing losses. Voltage regulation may be achieved by varying the ratio of ON to OFF time or duty cycle. Various topologies for switched-mode power converters are well known in the art including non-isolated and isolated topologies, for example boost converters, buck converters, synchronous buck converters, buck-boost converters, and fly-back converters.

In the interest of efficiency, digital logic technology is employing ever lower voltage logic levels. This requires power converters to deliver the lower voltages at higher currents level. To meet this requirement, power converters are employing more energy efficient designs. Power converters are also increasingly being located in close proximity to the load in as point of load (POL) converters in a POL scheme. These power converters must generate very low voltage levels (e.g., less than 1V) at increasingly higher current levels (e.g., greater than 10 A). These relatively high current levels may be difficult to achieve with a single power converter.

Manufacturers are also increasingly employing POL schemes in light of the widely varying voltage requirements in modern systems (e.g., computer systems). A POL scheme may be easier to design and/or fabricate, take up less area, and/or produce less interference than employing multiple different power buses. The POL schemes typically employ one or two power buses with a number of POL regulators located close to specific components or subsystems to be powered, for example microprocessors, field programmable gate arrays (FPGAs), application specific integrated circuits (ASICs), volatile memory. The POL regulators adjust voltage to supply localized busses feeding the specific components or subsystems.

Many devices employ input capacitors. For example, switched mode power converters typically include a large internal bulk filter capacitor to filter the input power to reduce noise conducted out of the power converter 100, back upstream to the source of the input power. The input capacitor may also store and/or smooth input power.

However, upstream devices (e.g., power converters) may not be able to source or start up devices with large capacitances. Often times, upstream power converters are internally limited, and enter a "hiccup" mode or repeatedly restart when faced with a large capacitive load. Thus, various attempts have been made to design circuits which effectively limit inrush current.

Present approaches to controlling the capacitive inrush current of a device typically employ a series resistance or directly sensing the inrush current of the device through resistive sensing, magnetic sensing, or Hall effect sensing. These approaches to sensing the actual input current waveform lead to a substantial power loss, complicated designs, and/or high costs to address electrical isolation requirements, as well as slow transient response. For example, sensing an input current with a resistive element dissipates power and requires specific circuitry to amplify the sense signal and reduce common mode noise. Sensing with a magnetic element reduces power dissipation. However, such an approach adds significant cost, requires added circuitry to amplify the signal, and is only applicable in AC current sensing applications. Thus, this approach is only useful for very high AC current applications. Due to their low sensitivity Hall effect sensors likewise require added circuitry to amplify the signal and to reduce common mode noise.

Thus, the various approaches require a number of tradeoffs due to design issues. For example, approaches which employ a permanently placed resistor to limit inrush current suffer from a substantial decrease in efficiency. It is typically difficult to derive an accurate input current signal without degrading the overall efficiency. Signal integrity degradation resulting from common mode noise/current is also a problem. Additionally, a voltage shift of the signal down to the electrical circuit ground potential may occur in some designs. Further, many approaches have had difficulty in maintaining fast transient response.

Additionally, many applications require that voltage be maintained within an acceptable range. Thus, under voltage and over voltage conditions must be monitored and handled.

New approaches to handling inrush current, under voltage and over voltage monitoring are desirable.

BRIEF SUMMARY

Control circuits described herein may effectively accomplish inrush current limiting. Such allows for predictable startup of a converter from bus sources that may themselves be current limited during the source startup. Inrush current limiting also protects relatively large input or filter capacitors from damage at startup. Such may improve reliability for circuit designs that require a high capacitance density in order to meet stringent noise specifications. Establishing a low and predictable inrush current can advantageously prevent occurrence of power-on reset events or non-monotonic startup from a current-limited or protected source.

The inrush current limiting may advantageously limit the inrush current into a bulk capacitance of a device during the initial power up of a device or during voltage transients without the need to directly sense the input current of the device. Instead, the inrush current limiting may be based on a signal that is proportional to the input current of the device.

Such may be particularly useful in power converters that have a large internal bulk filter capacitor. Power converter requirements continue to evolve toward higher efficiency and minimizing the number external parts needed. In the case of a switch mode power converter, incorporating bulk capacitive filtering of the input power internal to the power converter reduces noise conducted out of the power converter back into the source.

Controlling the inrush current to a device (e.g., power converter) capacitance reduces electrical stresses on the device, and on the any system employing the device.

The approaches described herein may have a number of benefits over existing approaches. For example, the approaches described herein may effectively limit inrush current without directly sensing the input current, resulting in overall higher efficiency. In particular, the approaches described herein may effectively limit inrush current based on a signal that is a mirror or representation of actual input current. The signal may advantageously be inherently referenced to a ground return of the circuit, dramatically reducing isolation requirements. By basing the inrush current control on a signal that is much smaller proportion of the actual inrush current, faster transient response to changes in the initial start up conditions or transient conditions can be achieved. The approaches described herein can implement inrush current limiting without an intrusive current measurement implementation, simplifying the circuit design and reducing cost. The approaches described herein may enable the reliable use of high-capacitance-density devices in the input filter of a power converter or other device. Further, the approaches described herein may use common elements to accomplish four different functions: inrush current limiting, under voltage lockout, remote enable, and over voltage lockup, using less complicated and less costly circuitry than prior approaches. Since only a small current proportional to the total capacitive inrush current is sensed to monitor the total input current, higher efficiency, faster transient response, lower circuit complexity and lower cost can be achieved than with existing solutions. Lower parts count and lower cost result from the shared circuitry. A series switch or series pass device as the primary component to accomplish the four functions allows for protection of downstream circuitry and monitoring a state of the converter, whether delivering power or OFF. The approaches described herein are not limited to power converters.

An input control circuit that controls inrush current may be summarized as including a series switch electrically coupled in series on an input line and operable in response to control signals to adjust a flow of an input current along the input line; a sense capacitor electrically coupled in parallel with an input filter capacitor between the input line and a ground reference to develop a signal that is proportional to the input current; a current sense mirror electrically coupled to the sense capacitor to receive the signal that is proportional to the input current; and a clamp circuit responsive at least to the current sense mirror to provide the control signals to the series switch to cause the series switch to adjust the flow of the input current along the input line. The current sense mirror may include a first mirror transistor coupled to the ground reference through a first mirror resistor and a second mirror transistor coupled to the ground reference through a second mirror resistor R8, a base of the first mirror transistor and a base of the second mirror transistor commonly coupled to the sense capacitor to maintain a constant inrush charge current to the input filter capacitor.

The input control circuit may further include a pair of trickle bias resistors electrically coupled between the input line and a source of the first mirror transistor of the current sense mirror.

The input control circuit may further include an over voltage lockout monitor circuit operable to detect an over voltage condition on the input line and coupled to supply a signal indicative of the over voltage condition to the clamp circuit, wherein the clamp circuit is further responsive at least to the over voltage lockout monitor circuit to provide control signals to the series switch to cause the series switch to stop the flow of the input current along the input line. The over voltage lockout monitor circuit may include a pair of over voltage lockout resistors coupled as a voltage divider between the input line and the ground reference via an over voltage lockout Zener diode which is coupled to drive a switch controlling transistor which is in turn coupled to control the series switch.

The over voltage lockout monitor circuit may further includes a low impedance charge path formed by a speedup diode and a speedup resistor electrically coupled between the input line and the base of the transistor.

The input control circuit may further include an under voltage lockout monitor circuit operable to detect an under voltage condition on the input line and coupled to supply a signal indicative of the under voltage condition to the clamp circuit, wherein the clamp circuit is further responsive at least to the under voltage lockout monitor circuit to provide control signals to the series switch to cause the series switch to stop the flow of the input current along the input line. The under voltage lockout monitor circuit may include an under voltage lockout comparator that has a first input and a second input, the first input coupled to the input line via a first under voltage lockout resistor R5 and the second input coupled to a voltage reference source via a second under voltage lockout resistor.

The input control circuit may further include an enable monitor circuit operable in response to an enable single to provide control signals to cause the series switch to stop the flow of the input current along the input line. The enable monitor circuit may be selectively operable electrically short the first and second inputs of the under voltage lockout comparator. The series switch may be a P-Channel metal oxide semiconductor field effect transistor (MOSFET) having a gate coupled to the clamp circuit and the clamp circuit includes a switch controlling transistor coupled to control the series switch.

The input control circuit may further include an over voltage lockout monitor circuit operable to detect an over voltage condition on the input line and coupled to supply a signal indicative of the over voltage condition to the clamp circuit; an under voltage lockout monitor circuit operable to detect an under voltage condition on the input line and coupled to supply a signal indicative of the under voltage condition to the clamp circuit; an enable monitor circuit operable in response to an enable single to provide control signals to the clamp circuit indicative of a disable state, and wherein the clamp circuit is further responsive at least to the over voltage lockout monitor circuit, the under voltage lockout monitor circuit, and the enable monitor circuit to provide control signals to the series switch to cause the series switch to stop the flow of the input current along the input line in response to a signal indicative of the over voltage condition, the under voltage condition, or a disable state. The sense capacitor may have a capacitance that is less than a capacitance of the input filter capacitor.

A method of operating an input control circuit may be summarized as including capacitively producing a signal proportional to input current; mirroring the signal proportional to input current; and adjusting a flow of the input current in response at least to the signal that is proportional to the input current to control an inrush current. Capacitively producing a signal proportional to input current may include allowing a sense capacitor coupled in parallel with an input filter capacitor between an input line and a ground to be charged by the input current and adjusting a flow of the input current includes supplying a signal from a clamp circuit to a series pass device electrically coupled in series on the input line.

The method may further include detecting at least one of an over voltage condition or an under voltage condition on the input line; and in response to detecting at least one of the over voltage condition or the under voltage condition on the input line providing a signal to the clamp circuit that causes the series pass device to stop the flow of the input current.

The method may further include detecting an enable signal indicative of a selected one of two states; in response to detecting the enable single of a first one of the two states providing a signal that causes the series pass device to stop the flow of the input current; and in response to detecting the enable single of a second one of the two states providing a signal that causes an under voltage lockout monitor circuit to function.

An input control circuit operable to control inrush current may be summarized as including a series switch operable in response to control signals to adjust a flow of an input current along an input line; an over voltage lockout monitor circuit operable to detect an over voltage condition on the input line and to produce a signal indicative of the over voltage condition; an under voltage lockout monitor circuit operable to detect an under voltage condition on the input line and to produce a signal indicative of the under voltage condition; an enable monitor circuit operable in response to an enable single to provide a signal indicative of an enable/disable condition; and a clamp circuit that provides control signals to control the series switch to adjust the flow of the input current along the input line in response to a signal that is proportional to the input current, and in response to the signals from the over voltage lockout monitor circuit, the under voltage lockout monitor circuit, and the enable monitor circuit. The clamp circuit may be responsive to the signals from the over voltage lockout monitor circuit, the under voltage lockout monitor circuit, and the enable monitor circuit to provide control signals that cause the series switch to stop the flow of the input current along the input line.

The input control circuit may further include a sense capacitor electrically coupled in parallel with an input filter capacitor between the input line and a ground reference to develop the signal that is proportional to the input current; and a current sense mirror electrically coupled to the sense capacitor to receive the signal that is proportional to the input current, the clamp circuit responsive to the current sense mirror.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power conversion topologies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1:
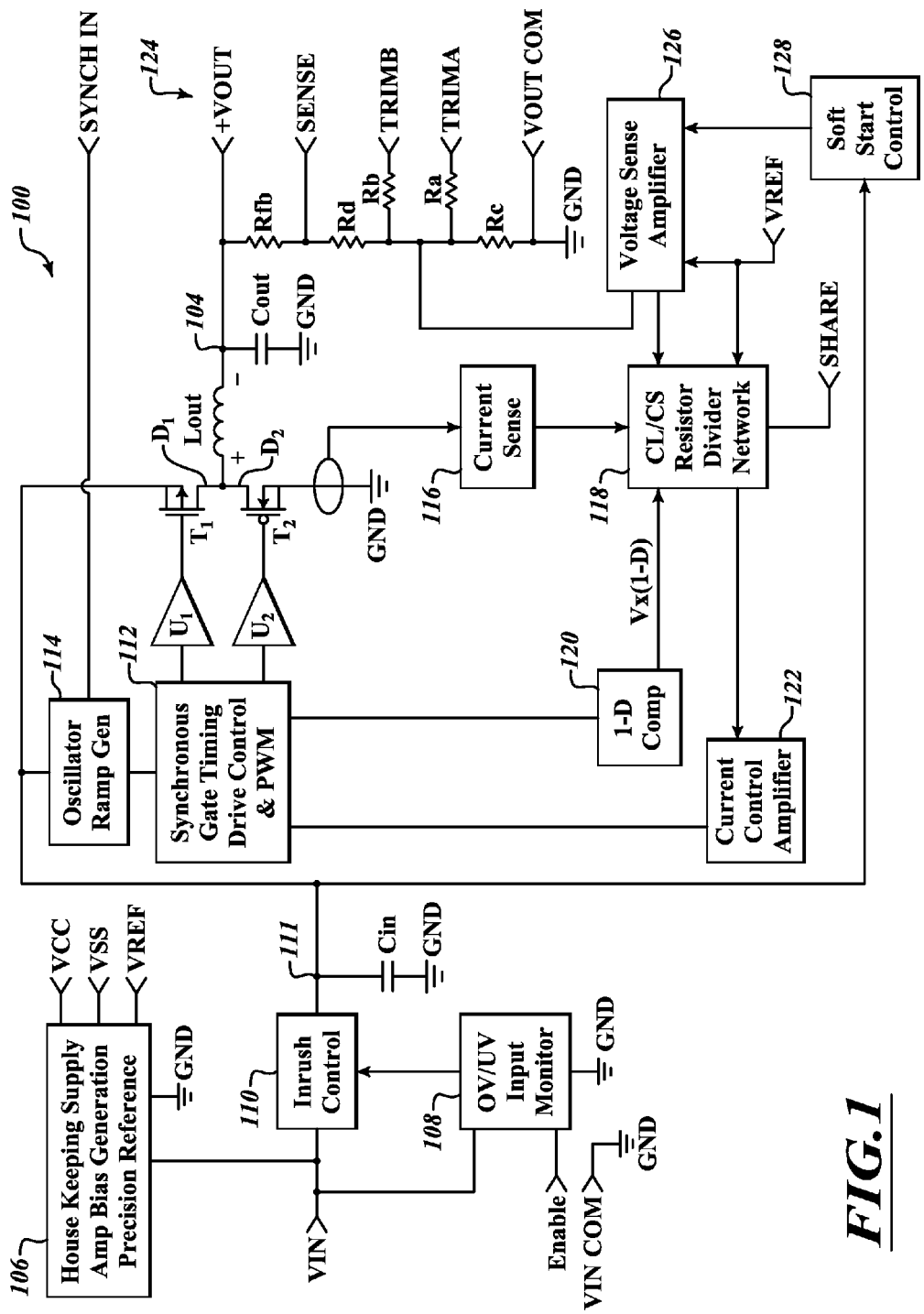
FIG. 1 is a schematic diagram of a power converter including an input control circuit with an inrush current control block, an over voltage/under voltage monitor block, and responsive to an enable signal, according to one illustrated embodiment.

FIG. 1 shows a power converter 100, according to one illustrated embodiment. The description of FIG. 1 provides an overview of the structure and operation of the power converter 100, which structure and operation are described in further detail with reference to FIGS. 2-7.

The power converter 100 may, for example, take the form of a DC/DC power converter to convert (e.g., raise, lower) DC voltages. The power converter 100 may, for example, include an output inductor Lout electrically coupled to an output terminal +VOUT, a first active switch (i.e., high side active switch) $T_1$ selectively operable to electrically couple the inductor Lout to a voltage or potential input terminal VIN. A second device $T_2$ electrically couples the output inductor Lout to a ground GND which is in turn electrically coupled to a ground or common input terminal VIN COM and a ground or common output terminal VOUT COM.

As illustrated, the power converter 100 may advantageously take the form of a synchronous buck converter, operable to lower a DC voltage or potential. Where implemented as a synchronous buck converter, the second device $T_2$ takes the form of a second active switch (i.e., high side active switch), selectively operable to electrically couple the output inductor Lout to ground GND. The power converter 100 may take forms other than a synchronous buck converter, for example a buck converter where the second device takes the form of a passive device, such as a diode (not shown).

The switches $T_1$, $T_2$ may take a variety of forms suitable for handling expected currents, voltages and/or power. For example, the switches $T_1$, $T_2$ make take the form of an active device, such as one or more metal oxide semiconductor field effect transistors (MOSFETs). As illustrated in the Figures, the first or high side switch $T_1$ may take the form of P-Channel MOSFET, while the second or low side switch $T_2$ make take the form of an N-Channel MOSFET. The output inductor Lout may be coupled via a node 102 to the drains $D_1$, $D_2$ of the MOSFET switches $T_1$, $T_2$ respectively. The power converter 100 may employ other types of switches, for example insulated gate bipolar transistors (IGBTs). While only one respective MOSFET is illustrated, each of the first and/or second switches $T_1$, $T_2$ may include two or more transistors electrically coupled in parallel.

The power converter 100 may include an output capacitor Cout electrically coupled between ground GND and a node 104 between the output inductor Lout and the output terminal +VOUT. Output capacitor Cout may smooth the output supplied to the output terminal +VOUT.

On an input side, the power converter 100 may include an auxiliary power supply and voltage reference generation block 106, an over voltage/under voltage monitor block 108 and/or an "in rush" current control block 110.

The auxiliary power supply and voltage reference generation block 106 implements a house keeping supply generation function, amplifier bias generation function and precision reference generation function, resulting in a positive supply voltage or potential VCC, a negative supply voltage or potential or ground VSS, and a precision reference voltage VREF. The structure and operation of the auxiliary power supply and voltage reference generation block 106 can take any existing form, and is not a subject of this application so is not described in further detail.

The over voltage/under voltage monitor block 108 monitors instances of over voltage and/or under voltage conditions, supplying a control signal via a control line (not called out in FIG. 1) to the "in rush" current control block 110 as needed. The over voltage/under voltage monitor block 108 or other components may be triggered via an enable signal via an enable input terminal ENABLE. The "inrush" current control block 110 controls "inrush" current, directly limiting current to input capacitor(s) Cin, reducing electrical stresses on the power converter 100 and any system into which the power converter 100 is incorporated. Power converters 100 typically employ large internal bulk filter capacitors to filter the input power to reduce noise conducted out of the power converter 100, back upstream to the source of the input power. The input capacitor $C_{in}$ is electrically coupled between ground GND and a node 111 between the "inrush" current control block 110 and the first active switch $T_1$. The "inrush" current control block 110 is configured to control the "inrush" current that flows to the input capacitor, particularly at initial application of the input voltage or potential VIN.

The structure and operation of the over voltage/under voltage monitor block 108, the "inrush" current control block 110, and the input capacitor(s) Cin may take any existing form, and are not subjects of this application so are not described in further detail.

Figure 2:
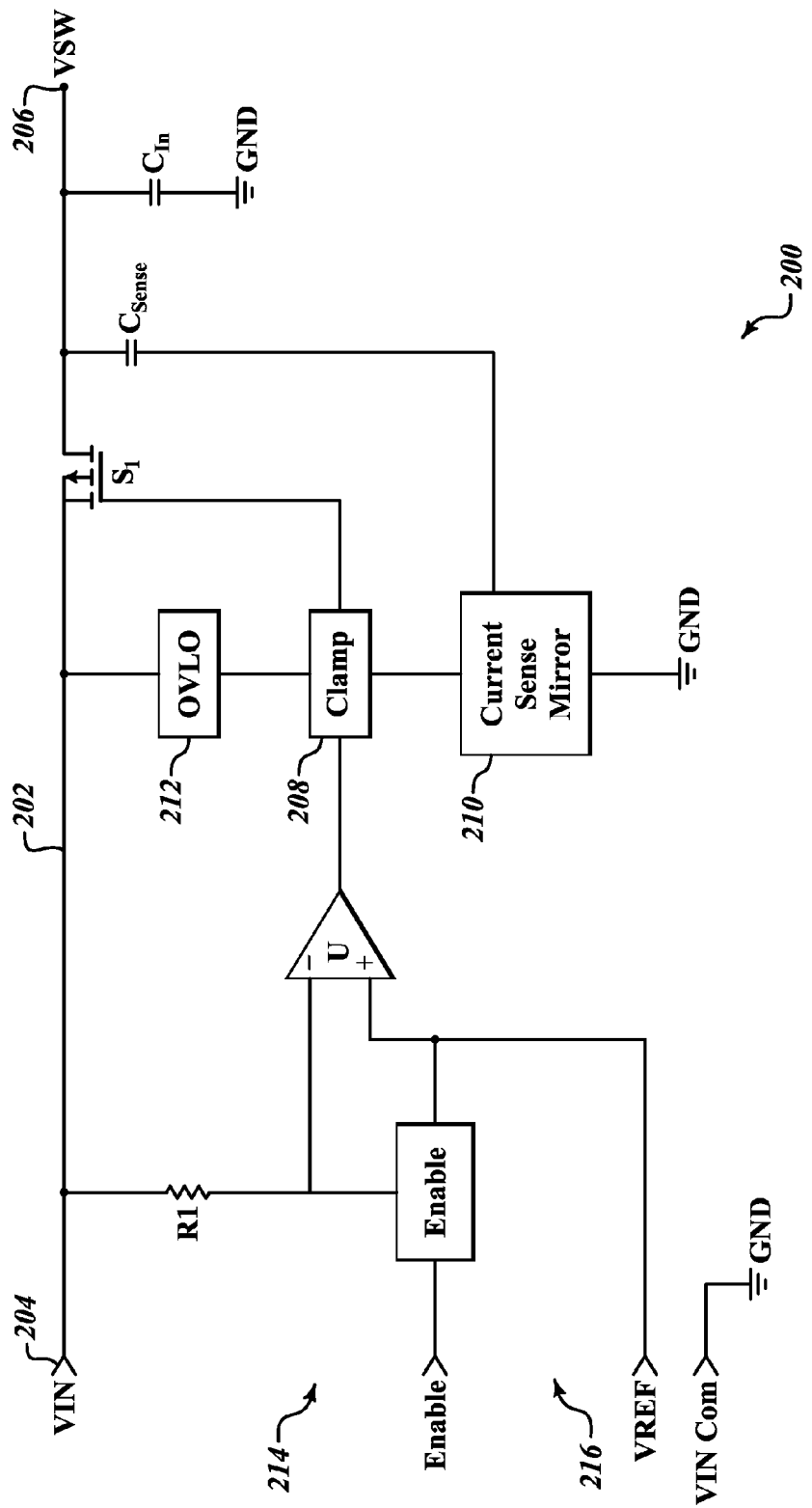
FIG. 2 is a functional block diagram of the input control circuit of FIG. 1 to control a current flow on an input line, according to one illustrated embodiment.

Control of the converter circuit (e.g., synchronous buck converter) is realized via a number of components or assemblies, represented in FIGS. 1 and 2 as blocks.

The power converter 100 includes a synchronous gate timing drive control and pulse width modulation (PWM) block 112. The synchronous gate timing drive control and pulse width modulation block 112 generates gate control signals to control the switches $T_1$, $T_2$, for example via amplifiers $U_1$, $U_2$, respectively. The synchronous gate timing drive control and pulse width modulation block 112 may optionally receive a share signal via a share input terminal SHARE from one or more other power converters, for example when electrically coupled to a common load for current sharing operation. The structure and operation of the a synchronous gate timing drive control and pulse width modulation (PWM) block 112 can take any existing form, and is not a subject of this application, so is not described in further detail.

The power converter 100 includes an oscillator ramp generation block 114, also interchangeably referred to herein and in the claims as oscillator or oscillator circuit 114. The oscillator ramp generation block 114 generates an oscillating ramp signal and provides the oscillating ramp signal to the synchronous gate timing drive control and pulse width modulation block 112. Advantageously, the oscillator ramp generation block 114 may be selectively synchronized to an external source over a wide frequency range. The oscillator ramp generation block 114 may receive a synchronization signal via a synchronization input terminal SYNC IN, to synchronize operation with one or more other power converters or other devices or systems, for example a clock of a system in which power converter 100 is installed. Such synchronization may advantageously reduce overall system noise. The oscillator ramp generation block 114 may advantageously take a form that provides for external slope modulation of the ramp signal, a wider temperature range and/or an ultra wide synchronous frequency range as compared to existing oscillator ramp generation circuits. The oscillator ramp generation block 114 may additionally, or alternatively, take a form that advantageously employs less complex types of components and/or is less expensive to produce as compared to existing oscillator ramp generation circuits. The structure and operation of exemplary embodiments of the oscillator ramp generation block 114 are described in detail herein with reference to FIGS. 2-7.

At a high level, the power converter 100 utilizes an inner current control loop and an outer voltage control loop. The inner current control loop is implemented via a current sense block 116, a current limiting/current sharing (CL/CS) resistor network 118, a 1-D (one minus duty cycle) compensation block 120 and a current control amplifier 122. The outer voltage control loop is implemented by a voltage sense resistor divider network 124 (e.g., resistor Rfb coupled between voltage output terminal +VOUT and sense terminal SENSE, divider resistors Rd, Rc, and trim resistors Rb, Ra coupled to trim terminals TRIMB, TRIMA, respectively) and a voltage error amplifier 126 which feeds the CL/CS resistor network 118 to ultimately control the output voltage of the power converter 100.

With respect to the inner current control loop, the current sense block 116 implements current sensing over a portion of a cycle of the power converter 100, for example over the ON or CLOSED portion of one of the switches $T_1$, $T_2$. The current sense block 116 provides a signal to the CL/CS resistor divider network 118 to control the current control amplifier 122, which signal is indicative of the sensed current. For example, the current sense block 116 may sense current over each portion of a cycle during which portion the low side switch T2 is ON or CLOSED (i.e., conducting), electrically coupling the output inductor $L_{out}$ to ground GND, while neglecting those portions of the cycle when the low side switch T2 is OFF or OPEN.

Where the output current of the synchronous buck converter circuit in the power converter 100 is sensed at the low side switch (e.g., MOSFET synchronous switch) $T_2$, the average of this sensed current is equal to Io*(1-D), where D is defined as the duty cycle of the high side switch (e.g., MOSFET) $T_1$. Since this signal is dependent on the duty cycle and negative in value, a compensation signal that is a direct function of the duty cycle is scaled via the 1-D compensation block 120, and summed with the sensed current signal by the CL/CS resistor network 118. The resultant signal is optionally level shifted in the CL/CS resistor network 118 to create a level shifted compensated signal. The level shifted compensated signal may then be averaged by the current control amplifier 122, and the averaged signal used to control the output current of the power converter 100.

The current control amplifier 122 generates control signals based at least on the level shifted compensated signals from the CL/CS resistor divider network 117 to control the synchronous gate timing drive control and pulse width modulation block 112.

With respect to the inner current control loop, the voltage sense resistor network 124 (e.g., resistor Rfb coupled between voltage output terminal +VOUT and sense terminal SENSE, divider resistors Rd, Rc, and trim resistors Rb, Ra coupled to trim terminals TRIMB, TRIMA, respectively) senses voltage or potential at the output terminal +VOUT with respect to the ground terminal VOUTCOM. The voltage sense resistor network 124 supplies a signal indicative of the sensed voltage or potential to the voltage sense amplifier 126. The voltage sense amplifier 126 generates a voltage error signal which indicates a difference between the sensed voltage or potential and a reference voltage or potential. Hence, the voltage sense amplifier 126 is interchangeably referred to herein and in the claims as voltage error amplifier 126. The voltage error amplifier 126 provides the voltage error signal to the current control amplifier 122 via the CL/CS resistor divider network 118, for use in generating the control signals supplied to the synchronous gate timing drive control and pulse width modulation block 112 to control output voltage or potential of the power converter 100.

The power converter 100 may optionally include a soft start control block 128. The soft start control block 128 may receive the precision voltage reference signal VREF from the auxiliary power supply and voltage reference generation block 106. The soft start control block 128 may control various soft start characteristics of the power converter 100, for example soft-start time, current limit thresholds, current limit on-time and output voltage or potential level at which control is handed over to a main control loop. The soft start control block 128 may, for example, provide a progressively increasing pulse width, forming a startup voltage ramp which is proportional to a level of a supply voltage VCC, for instance without the need of an external capacitor. The structure and operation of the soft start control block 128 can take any existing form, and is not a subject of this application so is not described in further detail.

The topology illustrated in and described with reference to FIG. 1 is illustrative of only one of the many possible converter topologies which may employ the auxiliary power supply and voltage reference generation block 106 described herein. For example, the auxiliary power supply and voltage reference generation block 106 may be employed in power converters which use a different converter circuit topology, for instance boost converter, buck converter or fly-back converter topologies. Also for example, the auxiliary power supply and voltage reference generation block 106 may be employed in power converters which use a different control topology, for instance a control topology that senses output current over an entire cycle of the waveform without the need for compensation, or which senses current at the high side active switch. Thus, this application, and in particular the claims, should not be limited to the specific topology illustrated in and discussed with reference to FIG. 1 unless expressly stated therein.

FIG. 2 shows an input control circuit 200 which implements both the inrush control block 110 (FIG. 1) and over voltage/under voltage monitor block 108 (FIG. 1) to control a current flow on an input line 202 between an input pin, terminal or node, an output pin, terminal or node, and an input or filter capacitor or capacitance Cin (e.g., bulk filter capacitor), according to one illustrated embodiment.

A primary function of the input control circuit 200 is control of an inrush current that flows into the input capacitor or capacitance Cin at initial application of the input voltage or potential Vin, VIN COM, in order to maintain a defined current level. Secondary functions of the input control circuit 200 include implementing enable functionality, under voltage lockout (UVLO) and/or over voltage lockout (OVLO) protection. The approaches described herein advantageously employ a signal that is a mirror or representation of actual input current to assess, monitor or otherwise reflect the inrush current to the input capacitor or capacitance Cin and control the same. The approaches described herein advantageously employ a signal that is inherently referenced to ground.

The input control circuit 200 implements inrush current control via a switch $S_1$, a sense capacitor Csense, a clamp circuit 208 and a current sense mirror circuit 210.

The switch $S_1$ is electrically coupled in series in the input line 202 between the input pin, terminal or node 204 and the output pin, terminal or node 206. Hence, the switch $S_1$ is interchangeably referred to herein and in the claims as series switch or series pass device. The switch $S_1$ is operable in response to control signals to adjust or regulate a flow of current therethrough, on the input line 202. For example, the switch $S_1$ is not only operable to stop a flow of current, but may also linearly regulate the flow of current. The switch $S_1$ may take a variety of forms, suitable for handling expected currents, voltages or power levels on the input line 202. For example, the switch $S_1$ may take the form of a metal oxide semiconductor field effect transistor (MOSFET), for instance a P-Channel MOSFET as illustrated in FIG. 2.

The sense capacitor Csense is electrically coupled in parallel with the input capacitor Cin, between the input line 202 and a ground reference GND via the current sense mirror circuit 210. Thus, the same voltage appears across the two capacitors Csense, Cin. Consequently, the current that charges the sense capacitor Csense is proportional to the current that charges the input capacitor Cin. The charge current in either of the capacitors Csense, Cin can be described by the fundamental relation:

$$I=C*dv/dt.$$

For each of the capacitors Csense, Cin, the fundamental current (I) versus voltage (V) equation is:

$$I\_Csense=Csense*dv/dt$$

$$I\_Cin=Cin*dv/dt.$$

Given that the change in voltage or potential with respect to time (dv/dt) for the two capacitors Csense, Cin is the same, the relationship that defines the proportionality constant between the charge currents of the two capacitors Csense, Cin is:

$$Iin = Isense * Cin/Csense.$$

From this relation it can be seen that the charge or inrush current in the input capacitor Cin can be controlled by sensing and controlling the charge current of the sense capacitor Csense. The ratio of capacitances of the input capacitor Cin and sense capacitor Csense (i.e., Cin/Csense) may take on a large variety of values, possibly with no minimum assuming low leakage capacitors are employed. In this respect, it is noted that any leakage in the sense capacitor Csense would form an error term, limiting the value of the sense capacitor Csense. In an example, input capacitor Cin may have a capacitance of about 220 uF, while the sense capacitor Csense has a capacitance of about 0.018 uF; a difference of more than 4 decades. It is further noted that the ratio Cin/Csense could be limited in the current sense mirror implementation illustrated in FIG. 3.

The current sense mirror circuit 210 is coupled to the sense capacitor Csense to sense the current in the sense capacitor Csense. The current sense mirror circuit 210 mirrors or produces a signal that is indicative of or represents the sensed current.

The clamp circuit 208 is coupled to control the series switch $S_1$. For example, the clamp circuit 208 may be coupled to supply control signals to a gate of the series switch $S_1$. As is made clear below, the clamp circuit 208 is responsive to signals from various components of the inrush control circuitry 110, including the sense current mirror 210. Thus, the clamp circuit 208 may generate, produce or supply control signals to linearly regulate the flow of current through the series switch $S_1$ to maintain a constant value based on the sensed current of the sense capacitor Csense.

The only prerequisite is that the series switch $S_1$ be ON or CLOSED at the instant of application of the input voltage or potential Vin (i.e., turn ON). This ensures sufficient initial charge current in the sense capacitor Csense to provide a feedback input into the current sense mirror circuit 210 to start the inrush control process. Once sufficient current in the sense capacitor Csense is present, the startup sequence continues with the current sense mirror circuit 210 controlling the clamp circuit 208 to continue holding a voltage or potential at a gate of the series switch $S_1$ at a level that maintains a constant inrush charge current to the input capacitor or capacitance Cin.

The input control circuit 200 optionally includes one or more of an over voltage lockout (OVLO) monitor circuit 212 to implement OVLO monitoring and control, Under voltage lockout (UVLO) monitor circuit 214 to implement UVLO monitoring and control, and/or enable signal monitor circuit 216 to implement enable signal monitoring and control. These circuits 212, 214, 216 may be coupled to the clamp circuit 208 to control the series switch $S_1$.

The OVLO monitor circuit 212 is coupled to the input line 202 and is operable to detect occurrences of over voltage conditions on the input line 202. Thus, the OVLO monitor circuit 212 may compare an actual voltage or potential on the input line 202 to a threshold voltage or potential that is indicative to an over voltage condition. In response to detection of an over voltage condition, the OVLO monitor circuit 212 provides a signal to the clamp circuit 208, to cause the clamp circuit 208 to cause the serial switch $S_1$ to turn OFF or OPEN, stopping the flow of current therethrough until the over voltage condition can be remedied.

The UVLO monitor circuit 214 is coupled to the input line 202 via an under voltage monitor resistor R1 and is operable to detect occurrences of over voltage conditions on the input line 202. The UVLO monitor circuit 214 may include a comparator U which compares the voltage or potential on the input line 202 to a threshold voltage or potential VREF that is indicative to an under voltage condition. In response to detection of an under voltage condition, the UVLO monitor circuit 214 provides a signal to the clamp circuit 208, to cause the clamp circuit 208 to cause the serial switch $S_1$ to turn OFF or OPEN, stopping the flow of current therethrough until the under voltage condition can be remedied.

The enable signal monitor circuit 216 may receive an enable signal Enable which is indicative of one of two states (e.g., HIGH, LOW) which may be denominated respectively as enable and disable. The enable signal monitor circuit 216 may apply the enable single to the clamp circuit 208, for example via the comparator U. For example, the enable signal monitor circuit 216 may apply the enable signal to a positive or non inverting pin of the comparator U. The state of the enable signal may be summed with the threshold voltage or potential VREF. Thus, an output of the comparator U may not trigger the clamp circuit 208 unless either: 1) the state of the enable signal is LOW (e.g., disable) or the input voltage or potential is below the threshold voltage or potential VREF (i.e., under voltage condition exists). As illustrated, the UVLO monitor circuit 214 and enable signal monitor circuit 216 may share components (e.g., comparator U), and/or be combined as an Enable/UVLO monitor circuit.

Thus, the clamp circuit 208 responds to three independent signal inputs. The first input is from the Enable/UVLO comparator U, which controls the series switch S1 to turn ON power to the output 206 if the enable signal Enable is true or HIGH and if the input voltage or potential VIN is above the UVLO threshold for operation VREF. The second input is from the current sense mirror circuit 210 which controls the series switch $S_1$ to maintain a constant input charge current to the input or filter capacitor or capacitance Cin as described above. The third input is from the OVLO monitor circuit 212 that turns OFF the series switch $S_1$ at the instant the input voltage or potential VIN increases above a predetermined level to protect the powered output circuitry.

Figure 3:
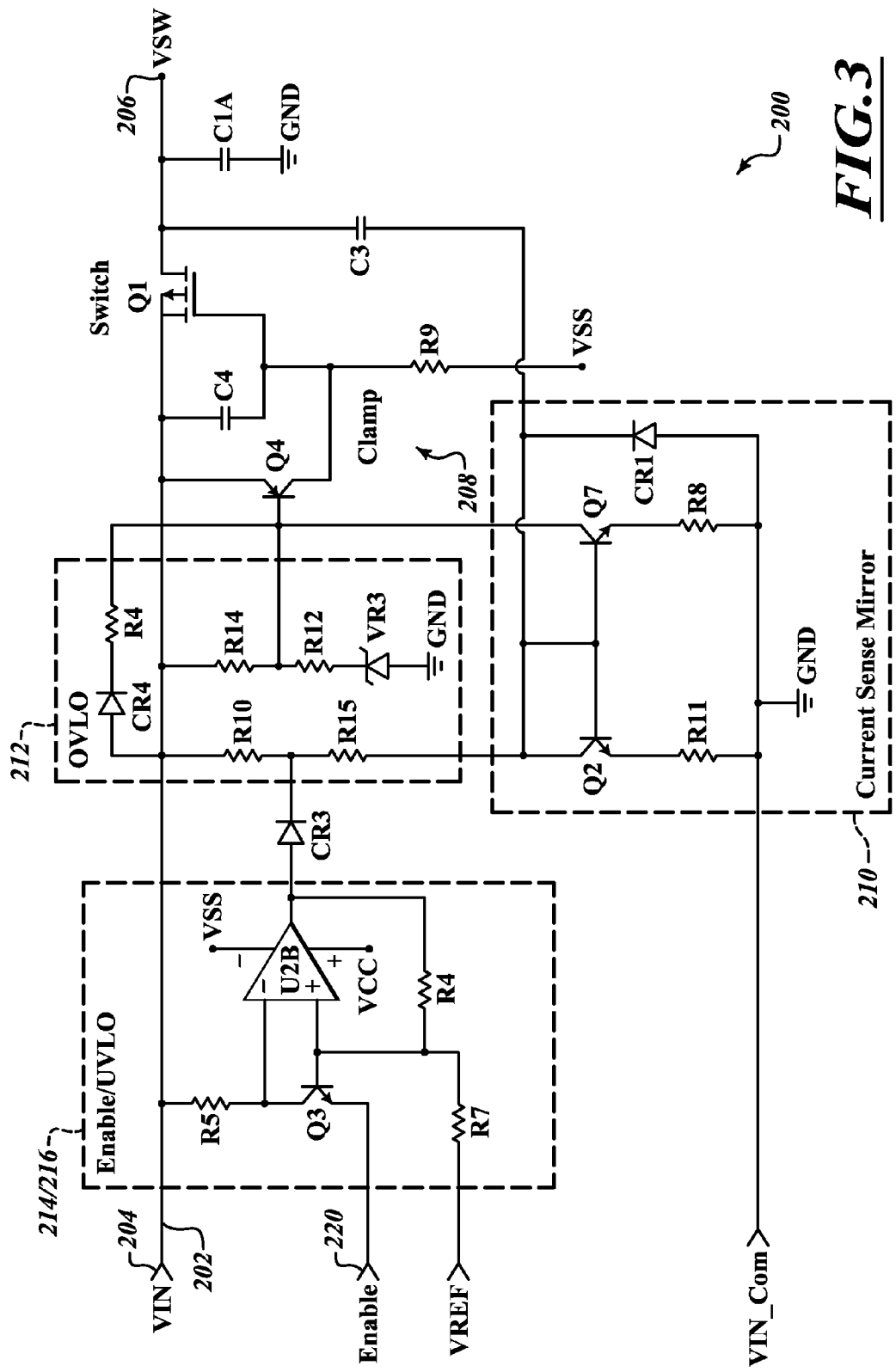
FIG. 3 is a detailed electrical schematic diagram of the input control circuit of FIGS. 1 and 2, according to one illustrated embodiment.

FIG. 3 shows the input control circuit 200 of FIGS. 1 and 2 in even more detail, operating to control a current flow on the input line 202 between the input pin, terminal or node 204 and the output pin, terminal or node 206, and the input or filter capacitor or capacitance CIA, according to one illustrated embodiment. As illustrated, the input control circuit 200 may employ less complex, and less costly discrete semiconductor components, chips resistors and capacitors, than employed by existing control circuitry.

Inrush Control

The inrush control function may be implemented by a series switch such a series pass device or transistor Q1 (e.g., P-channel MOSFET), a clamp circuit 208 including a switch controlling transistor Q4 (e.g., PNP transistor) coupled to control a gate-to-source voltage of the series pass device or transistor Q1, a sense capacitor or capacitance C3 and a current sense mirror circuit 210 to sense current or charge in the sense capacitor or capacitance C3. As noted the series pass device or transistor Q1 is couple in series in the input line 202 and operable to regulate current therethrough. A gate of the series pass device or transistor Q1 is coupled to the input line 202 via a capacitor C4 and to a voltage or potential supply source VSS through a supply resistor R9.

The clamp circuit 208 initiates a start up sequence turn ON of the series pass device or transistor Q1 based on a state of the enable signal Enable, and the UVLO and OVLO functions described below. Once series pass device or transistor Q1 starts to turn ON, the sense capacitor or capacitance C3 and input or filter capacitor or capacitance C1A start to charge. Any current passing through the sense capacitor or capacitance C3 will have to pass through a first mirror transistor Q2 and a first mirror resistor R11 coupled to a ground reference GND. Higher current through the first mirror resistor R11 creates a larger voltage drop across the first mirror resistor R11, which is reflected to a second mirror resistor R8, thus increasing current through a second mirror transistor Q7. As current through the second mirror transistor Q7 increases, a voltage drop across R14 becomes sufficient to turn ON the switch controlling transistor Q4. The turning ON of the switch controlling transistor Q4 starts the turning OFF of the series pass device or transistor Q1. The turning OFF of series pass device or transistor Q1 adjusts (e.g., slows) the voltage change (dv/dt) across the sense capacitor or capacitance C3, and thus reduces the current change (di/dt) through the sense capacitor or capacitance C3 and the input or filter capacitor or capacitance C1A. This negative feedback will keep the series pass device or transistor Q1 operating in the linear region, providing the desired voltage change (dv/dt) across the sense capacitor or capacitance C3 to provide negative feedback to the current mirror controlling the voltage change (dv/dt) across the sense capacitor or capacitance C3. Since the sense capacitor or capacitance C3 and the input or filter capacitor or capacitance C1A are in parallel, control over the sense capacitor or capacitance C3 will also control the voltage change (dv/dt) and thus the current change (di/dt) through the input or filter capacitor or capacitance C1A.

A pair of trickle bias resistors R10, R15 provide initial trickle bias current for the mirror transistors Q2, Q7. A speedup diode CR4 and speedup resistor R3 provide a low impedance charge path to speed up the turn ON of the switch controlling transistor Q4. The speedup resistor R3 is typically a factor of 10 to 100 times smaller in resistance value than the OVLO resistor R14. OVLO resistors R12, R14 and Zener diode VR3 implement the OVLO function as described below.

Over Voltage Lockout

The OVLO threshold voltage or potential is set above the desired operating voltage range of the powered circuitry. At an input voltage or potential VIN above the normal operating voltage range but just below the OVLO threshold, a base-emitter voltage of switch controlling transistor Q4 increases, slightly turning the switch controlling transistor Q4 ON, but not hard enough to short the gate of the series pass device or transistor Q1. Further increases in the input voltage or potential VIN causes the current sense mirror circuit 210 to draw more current, and will cause the OVLO Zener diode VR3 to conduct more. Both of these effects turn the switch controlling transistor Q4 ON harder. At the prescribed OVLO threshold, current through the OVLO Zener diode VR3 will increase very rapidly, dropping more voltage across the OVLO resistors R14, R12. Once the voltage across a first one of the OVLO resistors R14 is around 0.65V, depending on temperature, the voltage will cause the switch controlling transistor Q4 to turn ON, which will in cause the series pass device or transistor Q1 to turn OFF, cutting off power to the output pin, terminal, or node 206. Reducing the input voltage or potential VIN down to within the normal operating voltage range reduces a voltage across the first OVLO resistor R14, causing the switch controlling transistor Q4 to turn OFF, and allowing the series pass device or transistor Q1 to turn ON, starting a startup sequence.

Enable

The enable functionality or inhibit action is implemented via an enable/ULVO transistor Q3, enable/ULVO operational amplifier U2B, enable/ULVO resistors R4, R5, R7. With the enable pin or terminal 220 floating or pulled HIGH, the enable/ULVO transistor Q3 is turned OFF setting a voltage or potential at a negative input or pin of the enable/ULVO operational amplifier U2B equal to the input voltage or potential VIN. The voltage or potential at a positive input or pin of the enable/ULVO operational amplifier U2B will be equal to the reference voltage or potential VREF (e.g., 2.5V). With the negative input or pin of the enable/ULVO operational amplifier U2B higher than the positive input or pin thereof, the output of the enable/ULVO operational amplifier U2B will be LOW and not affect the status of series pass device or transistor Q1. The series pass device or transistor Q1 is then controlled by the UVLO function during power ON startup or by the OVLO function during an input voltage or potential VIN over voltage condition.

Pulling the enable pin to LOW effectively ties the emitter of the enable/ULVO transistor Q3 to ground, causing the enable/ULVO transistor Q3 to turn ON and saturate. With the enable/ULVO transistor Q3 saturated, its collector voltage will be slightly lower than its base voltage. This causes an output of the enable/ULVO operational amplifier U2B to go HIGH, providing current through enable/ULVO diode CR3 to turn the mirror transistors Q2, Q7 ON hard enough to cause the switch controlling transistor Q4 to turn ON. With the switch controlling transistor Q4 ON, the gate-to-source voltage of the series pass element or transistor Q1 is shorted, and the series pass element or transistor Q1 will turn OFF, interrupting power flow.

Under Voltage Lockout

The threshold VREF of the UVLO circuit 214 is set to be triggered by an input voltage or potential VIN less than a desired operating voltage. When the input voltage or potential VIN is at or below the UVLO threshold VREF, the negative input or pin of the enable/ULVO operational amplifier U2B will be at a lower voltage than the threshold VREF and lower than a voltage or potential at the positive input or pin of the enable/ULVO operational amplifier U2B. This causes output of the enable/ULVO operational amplifier U2B to go HIGH providing current through enable/ULVO diode CR3 to turn ON the mirror transistors Q2, Q7 hard enough to cause the switch controlling transistor Q4 to turn ON. With the switch controlling transistor Q4 ON, the gate-to-source of the series pass device or transistor Q1 is shorted, keeping the series pass device or transistor Q1 OFF and interrupting power flow.

Increasing the input voltage or potential VIN to within a normal operating input voltage range results in the negative input of the enable/ULVO operational amplifier U2B at a higher voltage than the threshold VREF, the voltage or potential at the positive input or pin of the enable/ULVO operational amplifier U2B. This causes the output of the enable/ULVO operational amplifier U2B to go LOW causing the switch controlling transistor Q4 to turn OFF. With the switch controlling transistor Q4 OFF, the voltage on the gate of the series pass device or transistor Q1 is pulled to negative supply voltage VSS, turning on the series pass device or transistor Q1, and starting a startup sequence.

Operation of the above described circuit functions is predicated on the presence of bias voltages or potentials, positive supply voltage or potential VCC and negative supply voltage or potential VSS at or below the UVLO threshold VREF.

Figure 4:
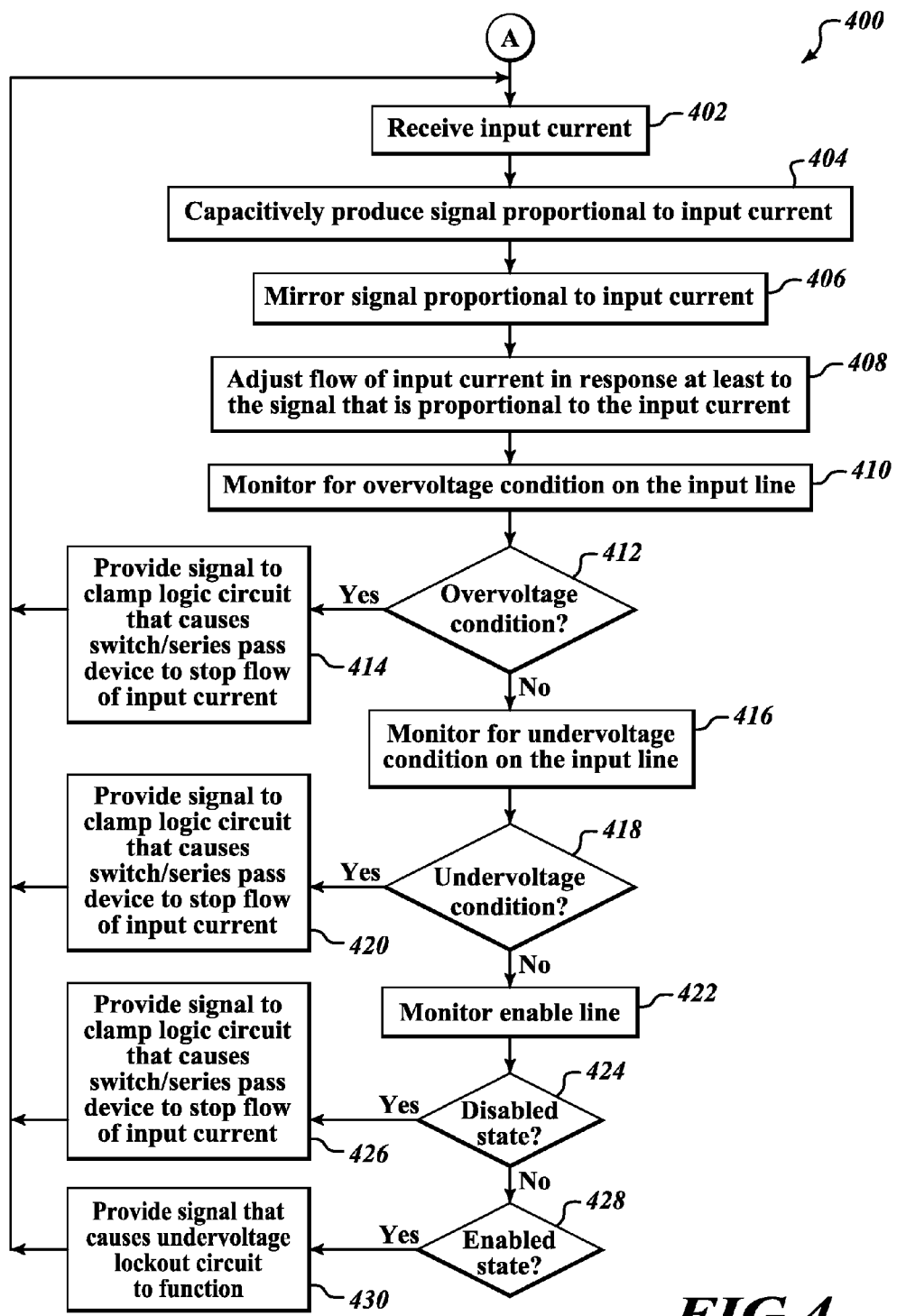
FIG. 4 is a flow diagram of a method of operating the input control circuit of FIGS. 1-3, according to one illustrated embodiment.

FIG. 4 shows a flow diagram of a method 400 of operating the input control circuit 110/108, 200 of FIGS. 1-3, according to one illustrated embodiment.

At 402, an input line 202 receives input current VIN at an input terminal, pin or node 204. The input voltage or potential VIN may be the input voltage supplied to the power converter 100 (FIG. 1) from some upstream component. For example, the input voltage or potential VIN may be supplied to the power converter from a rectifier, a DC/DC converter, an isolating converter stage, and/or a DC electrical power storage device such as an array of chemical battery cells or ultracapacitors.

At 404, the sense capacitor Csense (FIG. 2), C3 (FIG. 3) capacitively produces a signal proportional to input current by charging from the input current. At 406, a current sense mirror circuit mirrors the signal proportional to input current.

At 408, a switch S1 (FIG. 2), series pass device or transistor (FIG. 3) adjusts a flow of input current through the input line 202 in response at least to the signal that is proportional to the input current.

At 410, an OVLO monitor circuit 212 monitors for an over voltage condition on the input line 202. At 412, the OVLO monitor circuit 212 determines If an over voltage condition occurred. If an over voltage condition has occurred, then the OVLO monitor circuit provides a signal to a clamp circuit 208 at 414 that causes the switch S1, series pass device or transistor Q1 to stop a flow of input current through the input line 202. Control may then return to 402. If an over voltage condition has not occurred, control passes directly to 416.

At 416, an UVLO monitor circuit 214 monitors for occurrence of an under voltage condition on the input line 202. At 418, the UVLO monitor circuit 214 determines whether an under voltage condition has occurred. If an under voltage condition has occurred, then the UVLO monitor circuit 214 provides a signal to the clamp circuit 208 at 420 that causes the switch S1, series pass device or transistor Q1 to stop a flow of input current through the input line 202. Control may then return to 402. If an under voltage condition has not occurred, control passes directly to 422.

At 422, an enable circuit 216 monitors an enable line ENABLE for enable signals. At 424 the enable circuit 218, comparator U or operational amplifier U2B determines If the enable signal indicates a disable state. If the enable signal indicates a disabled state, then at 426 the enable circuit 216, comparator U or operational amplifier U2B provide a signal to the clamp circuit 208 that causes the switch S1, series pass device or transistor Q1 to stop a flow of current in the input line 202. Control may then return to 402.

At 428 the enable circuit 218, comparator U or operational amplifier U2B determines If the enable signal indicates an enable state. If the enable signal indicates an enable state, then at 430 the enable circuit 216, comparator U or operational amplifier U2B provides a signal to that causes the under voltage lockout circuit 214 to function.

The method 400 may repeat while the power converter 100 is operational, the oscillation circuit 114 continually generating, producing or supplying the oscillation ramp signal VRAMP. Typically, most of these operations or acts will be execute concurrently and fairly continuously by the circuitry.

Figure 5:
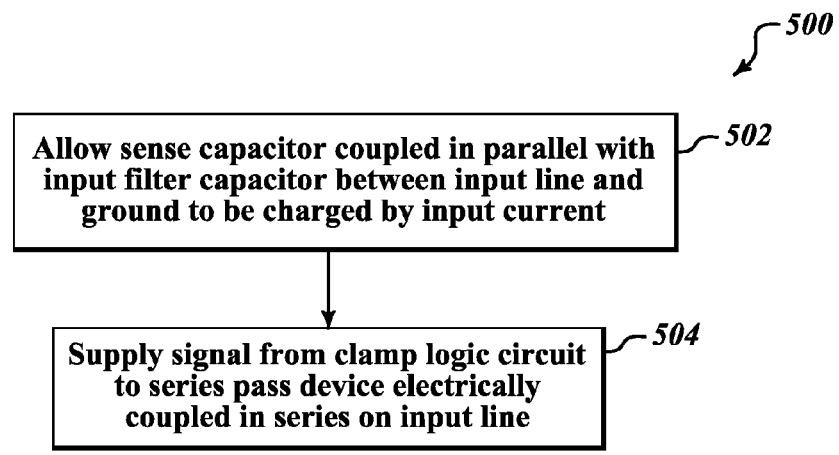
FIG. 5 is a flow diagram of a method of operating the input control circuit of FIGS. 1-3, according to one illustrated embodiment, which may be implemented as part of performing the method of FIG. 4.

FIG. 5 shows a method 500 of operating the input control circuit 110/108, 200 of FIGS. 1-3, according to one illustrated embodiment. The method 500 may be implemented as part of performing the method 400 of FIG. 4.

At 502, a sense capacitor Csense coupled in parallel with an input or filter capacitor or capacitance CIN, C3 between input line 202 and ground GND to be charged by input current is allowed to charge by an input current carried by the input line 202.

At 504, a signal is supplied from a clamp circuit 208 to a switch S1, series pass device or transistor Q1 electrically coupled in series on input line 202. The signal may cause the switch S1, series pass device or transistor Q1 to turn ON, allow current to pass on the input line 202, or turn OFF and thereby preventing input current from being supplied to the input or filter capacitor or capacitance CIN, C3.

While described above in the environment of a power converter, and in particular a switch mode DC/DC synchronous buck power converter, the control circuitry described herein may be advantageously employed in a large variety of other environments. Such environments may include other types of DC/DC power converters (e.g., boost, buck-boost, flyback), whether isolated or non-isolated. Such may also include other types of power converters, including inverters (DC/AC). Such may also include many other types of non-power converter environments, which require inrush current control, OVLO protection, UVLO protection, and remote enable functionality. Such may be particularly useful for systems which have relatively large input or filter capacitors or capacitance.

The specific values, such as specific voltages or potentials, used herein are purely illustrative, and are not meant to be in anyway limiting on the scope. Likewise, the arrangements and topologies are merely illustrative and other arrangements and topologies may be employed where consistent with the teachings herein. While specific circuit structures are disclosed, other arrangements that achieve similar functionality may be employed. The terms switched mode and switch mode are used interchangeable herein and in the claims.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act or operation through the use of appropriate circuitry.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. patent applications:

Ser. No. 13/185,142, titled "POWER CONVERTER APPARATUS AND METHOD WITH COMPENSATION FOR LIGHT LOAD CONDITIONS";

Ser. No. 13/185,217, titled "SELF SYNCHRONIZING POWER CONVERTER APPARATUS AND METHOD SUITABLE FOR AUXILIARY BIAS FOR DYNAMIC LOAD APPLICATIONS";

Ser. No. 13/185,172, titled "POWER CONVERTER APPARATUS AND METHOD WITH COMPENSATION FOR CURRENT LIMIT/CURRENT SHARE OPERATION";

Ser. No. 13/185,152, titled "OSCILLATOR APPARATUS AND METHOD WITH WIDE ADJUSTABLE FREQUENCY RANGE"; and Ser. No. 61/508,937, titled "POWER CONVERTER APPARATUS AND METHODS";

all filed on Jul. 18, 2011, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An input control circuit that controls inrush current, comprising:
 a series switch electrically coupled in series on an input line and operable in response to control signals to adjust a flow of an input current along the input line;
 a sense capacitor directly connected to an input filter capacitor on the input line to develop a signal that is proportional to the input current;
 a current sense mirror electrically coupled to the sense capacitor to receive the signal that is proportional to the input current that is charging the input filter capacitor; and
 a clamp circuit responsive at least to the current sense mirror to provide the control signals to the series switch to cause the series switch to adjust the flow of the input current along the input line.

2. The input control circuit of claim 1 wherein the current sense mirror includes a first mirror transistor coupled to a ground reference through a first mirror resistor and a second mirror transistor coupled to the ground reference through a second mirror resistor, a base of the first mirror transistor and a base of the second mirror transistor commonly coupled to the sense capacitor to maintain a constant inrush charge current to the input filter capacitor.

3. The input control circuit of claim 2, further comprising:
 a pair of trickle bias resistors electrically coupled between the input line and a source of the first mirror transistor of the current sense mirror.

4. The input control circuit of claim 1, further comprising:
 an over voltage lockout monitor circuit operable to detect an over voltage condition on the input line and coupled to supply a signal indicative of the over voltage condition to the clamp circuit, wherein the clamp circuit is further responsive at least to the over voltage lockout monitor circuit to provide control signals to the series switch to cause the series switch to stop the flow of the input current along the input line.

5. The input control circuit of claim 4 wherein the over voltage lockout monitor circuit includes a pair of over voltage lockout resistors coupled as a voltage divider between the input line and a ground reference via an over voltage lockout Zener diode which is coupled to drive a switch controlling transistor which is in turn coupled to control the series switch.

6. The input control circuit of claim 5 wherein the over voltage lockout monitor circuit further includes a low impedance charge path formed by a speedup diode and a speedup resistor electrically coupled between the input line and the base of the transistor.

7. The input control circuit of claim 1, further comprising:
 an under voltage lockout monitor circuit operable to detect an under voltage condition on the input line and coupled to supply a signal indicative of the under voltage condition to the clamp circuit, wherein the clamp circuit is further responsive at least to the under voltage lockout monitor circuit to provide control signals to the series switch to cause the series switch to stop the flow of the input current along the input line.

8. The input control circuit of claim 7 wherein the under voltage lockout monitor circuit includes an under voltage lockout comparator that has a first input and a second input, the first input coupled to the input line via a first under voltage lockout resistor and the second input coupled to a voltage reference source via a second under voltage lockout resistor.

9. The input control circuit of claim 8, further comprising:
 an enable monitor circuit operable in response to an enable single to provide control signals to to cause the series switch to stop the flow of the input current along the input line.

10. The input control circuit of claim 9 wherein the enable monitor circuit is selectively operable electrically short the first and second inputs of the under voltage lockout comparator.

11. The input control circuit of claim 1 wherein the series switch Q1 is a P-Channel metal oxide semiconductor field effect transistor (MOSFET) having a gate coupled to the clamp circuit and the clamp circuit includes a switch controlling transistor coupled to control the series switch.

12. The input control circuit of claim 11, further comprising:
 an over voltage lockout monitor circuit operable to detect an over voltage condition on the input line and coupled to supply a signal indicative of the over voltage condition to the clamp circuit;
 an under voltage lockout monitor circuit operable to detect an under voltage condition on the input line and coupled to supply a signal indicative of the under voltage condition to the clamp circuit;
 an enable monitor circuit operable in response to an enable single to provide control signals to the clamp circuit indicative of a disable state, and
 wherein the clamp circuit is further responsive at least to the over voltage lockout monitor circuit, the under voltage lockout monitor circuit, and the enable monitor circuit to provide control signals to the series switch Q1 to cause the series switch to stop the flow of the input current along the input line in response to a signal indicative of the over voltage condition, the under voltage condition, or a disable state.

13. The input control circuit of claim 1 wherein the sense capacitor has a capacitance that is less than a capacitance of the input filter.

14. A method of operating an input control circuit, the method comprising:
 capacitively producing a signal proportional to an input current;
 mirroring the signal proportional to input current; and
 adjusting a flow of the input current in response at least to the signal that is proportional to the input current to control an inrush current.

15. The method of claim 14 wherein capacitively producing a signal proportional to input current includes allowing a sense capacitor directly coupled to an input filter capacitor on an input line to be charged by the input current and adjusting a flow of the input current includes supplying a signal from a clamp circuit to a series pass device electrically coupled in series on the input line.

16. The method of claim 15, further comprising:
 detecting at least one of an over voltage condition or an under voltage condition on the input line; and
 in response to detecting at least one of the over voltage condition or the under voltage condition on the input line providing a signal to the clamp circuit that causes the series pass device to stop the flow of the input current.

17. The method of claim 15, further comprising:
   detecting an enable signal indicative of a selected one of two states;
   in response to detecting the enable single of a first one of the two states providing a signal that causes the series pass device to stop the flow of the input current; and
   in response to detecting the enable single of a second one of the two states providing a signal that causes an under voltage lockout monitor circuit to function.

18. An input control circuit operable to control inrush current, comprising:
   a series switch operable in response to control signals to adjust a flow of an input current along an input line;
   an over voltage lockout monitor circuit operable to detect an over voltage condition on the input line and to produce a signal indicative of the over voltage condition;
   an under voltage lockout monitor circuit operable to detect an under voltage condition on the input line and to produce a signal indicative of the under voltage condition;
   a sense capacitor directly connected to an input filter capacitor on the input line to develop a signal that is proportional to the input current;
   a current sense mirror electrically coupled to the sense capacitor to receive the signal that is proportional to the input current;
   an enable monitor circuit operable in response to an enable single to provide a signal indicative of an enable/disable condition; and
   a clamp circuit that provides control signals to control the series switch to adjust the flow of the input current along the input line in response to the current sense mirror, the clamp circuit is responsive to the signals from the over voltage lockout monitor circuit, the under voltage lockout monitor circuit, and the enable monitor circuit to provide control signals that cause the series switch to stop the flow of the input current along the input line.

* * * * *